United States Patent
Karp et al.

(10) Patent No.: US 8,046,838 B1
(45) Date of Patent: Oct. 25, 2011

(54) USING A MODULATION TRANSFER FUNCTION OF A DEVICE TO CREATE DIGITAL CONTENT FOR THE DEVICE

(75) Inventors: Alan H. Karp, Palo Alto, CA (US); Ashwin Swaminathan, Greenbelt, MD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1091 days.

(21) Appl. No.: 11/799,060

(22) Filed: Apr. 30, 2007

(51) Int. Cl.
*G06F 7/04* (2006.01)
*G06F 12/14* (2006.01)
*G06F 15/16* (2006.01)
*G06F 21/00* (2006.01)
*H04N 7/167* (2011.01)

(52) U.S. Cl. ............ 726/26; 726/22; 713/187; 713/189; 380/201; 380/203; 709/231; 709/232; 705/51; 705/57

(58) Field of Classification Search .................... 726/26, 726/22; 713/187, 189; 380/201, 203; 709/231, 709/232; 705/51, 57
See application file for complete search history.

(56) References Cited

U.S. PATENT DOCUMENTS

| 7,668,312 | B2 * | 2/2010 | Lecomte et al. ............... 380/210 |
| 2004/0260559 | A1 * | 12/2004 | Kentish et al. ................ 704/273 |
| 2005/0273439 | A1 * | 12/2005 | Yen et al. ........................ 705/59 |
| 2007/0136315 | A1 * | 6/2007 | Choi et al. ....................... 707/10 |
| 2007/0168048 | A1 * | 7/2007 | Allen et al. ....................... 700/2 |
| 2008/0059992 | A1 * | 3/2008 | Amidon et al. ................. 725/25 |

* cited by examiner

*Primary Examiner* — Aravind Moorthy (57) ABSTRACT

A modified modulation transfer function of a device is determined. The modified modulation transfer function includes intentional deviations from a nominal modulation transfer function of the device. A digital content object is modified based on the modified modulated transfer function to optimize playback of the digital content object on the device, and the modified digital content object is distributed to the device.

20 Claims, 6 Drawing Sheets

USING A MODULATION TRANSFER FUNCTION OF A DEVICE TO CREATE DIGITAL CONTENT FOR THE DEVICE

BACKGROUND

Digital Rights Management (DRM) is a great concern for digital content owners, such as owners of songs, movies, electronic books, documents and other types of digital media. Content owners try to sell and/or distribute their content in such a way to prevent the illegal copying of their content. For example, content, such as movies are widely sold and distributed on digital video discs (DVDs). To prevent illegal copying, DVDs typically include copy protection mechanisms that prevent users from making copies.

It has currently become very convenient and popular to purchase and download digital content, such as purchasing and downloading songs or other types of digital content via the Internet. In practice, most online content delivery stores also use some form of DRM technology to protect against unauthorized copying.

Typically, the DRM protection downloaded content or content distributed via DVD or CD includes controlling the copying of the bits contained in the digital content. For example, hardware or software in devices operable to play the digital content, such as portable media players, DVD players, compact disc (CD) players, personal computers (PCs), etc., may include built-in protections that do not allow the device to play the digital content or copy the digital content unless playing or copying is authorized, for example, by purchasing the content. However, because of these protections, the device may prevent playing or copying of some content that would not be a violation of an owner's rights, such as playing or copying home-made movies or other home-made content. Furthermore, even though the distributed content includes copy protection mechanisms, just as many mechanisms exist that can make unauthorized copies of the copy-protected content.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the embodiments are described. However, one of ordinary skill in the art would readily recognize that the same principles are equally applicable to, and can be implemented using variations of the described embodiments.

According to an embodiment, a modulation transfer function (MTF) of a device operable to play digital content is modified from a nominal MTF. Digital content may include audio, video, still images, text, or other types of media, or any combination of different types of content, such as multimedia content. An MTF for a device is a measure of the transfer of modulation (or contrast) from the digital content to the playback of the digital content on the device. In other words, the MTF measures how faithfully the digital content is reproduced on the device during playback.

Each class of device typically has a nominal MTF. For example, speakers and headsets for devices operable to play content are designed to play each frequency at a predetermined output. One example of audio frequency vs output in a nominal MTF may be that the frequencies representing a music note of low-C have an output of 7 decibels (dB) on every device given a tolerance. In another example, displays have a nominal MTF for visual frequencies. The nominal MTF may be predetermined for each class of device or output type, such as speakers or display, for a device so digital content played on different devices sounds similar.

According to an embodiment, the MTF for each device is modified so the output of the same digital content played on each device is different. That is each device has a modified MTF, which is an MTF modified from a nominal MTF. For example, a modified MTF for a device causes certain audible frequencies to be louder or softer than nominal. For example, one device has a modified MTF playing a low-C at 3 dB and another device plays a low-C at 10 dB. In another example, the modified MTF causes certain visible frequencies of an image to be brighter or dimmer than nominal.

The deviations from nominal are intentional deviations, and may be used to create digital content optimized for each device to prevent unauthorized use of the digital content on other devices. Digital content to be played on a device with a modified MTF is also modified based on the modified MTF. For example, a modified version of the digital content is created from an original, unmodified version of the digital content. The modified version of the digital content is optimized for playback on the device with the modified MTF. For example, if the modified MTF causes a certain audible frequency to be louder, then that audible frequency in the digital content is modified to play softer. In another example, if modified MTF causes a certain visible frequency of an image to be brighter, then that visible frequency in the digital content is modified to be dimmer. If a device with an MTF different than the modified MTF plays the version of the digital content, the quality of the playback of the digital content is degraded. For example, a song is downloaded for a first user's device, and the song is modified for optimal playback based on the modified MTF of the first user's device. If the user makes an unauthorized copy for playback on a second user's device, the fidelity of the song played on the second user's device will be degraded because the second user's device has a different MTF than the first user's device. Assuming every device has a different modified MTF, then any copy made for playback on another device would be degraded during playback. The quality degradation may be such that playback would be unsatisfactory for a user.

This approach to protecting digital content sidesteps the difficult problem of trying to generate a bit-copying protection scheme, through encryption or other form of DRM protection, which cannot be cracked. Furthermore, creating a modified version of the digital content optimized for playback on a device with a certain modified MTF creates a version of the digital content with a particular signature. That is, the modified version of the digital content is varied based on a particular modified MTF. The modified version of the digital content may be associated with the device having the modified MTF, for example, using a database or other tracking technique. Then, if an unauthorized copy of the modified digital content is found, the unauthorized copy can be associated with the device having the modified MTF. This may be used to identify a user or device making unauthorized copies.

Figure 1:
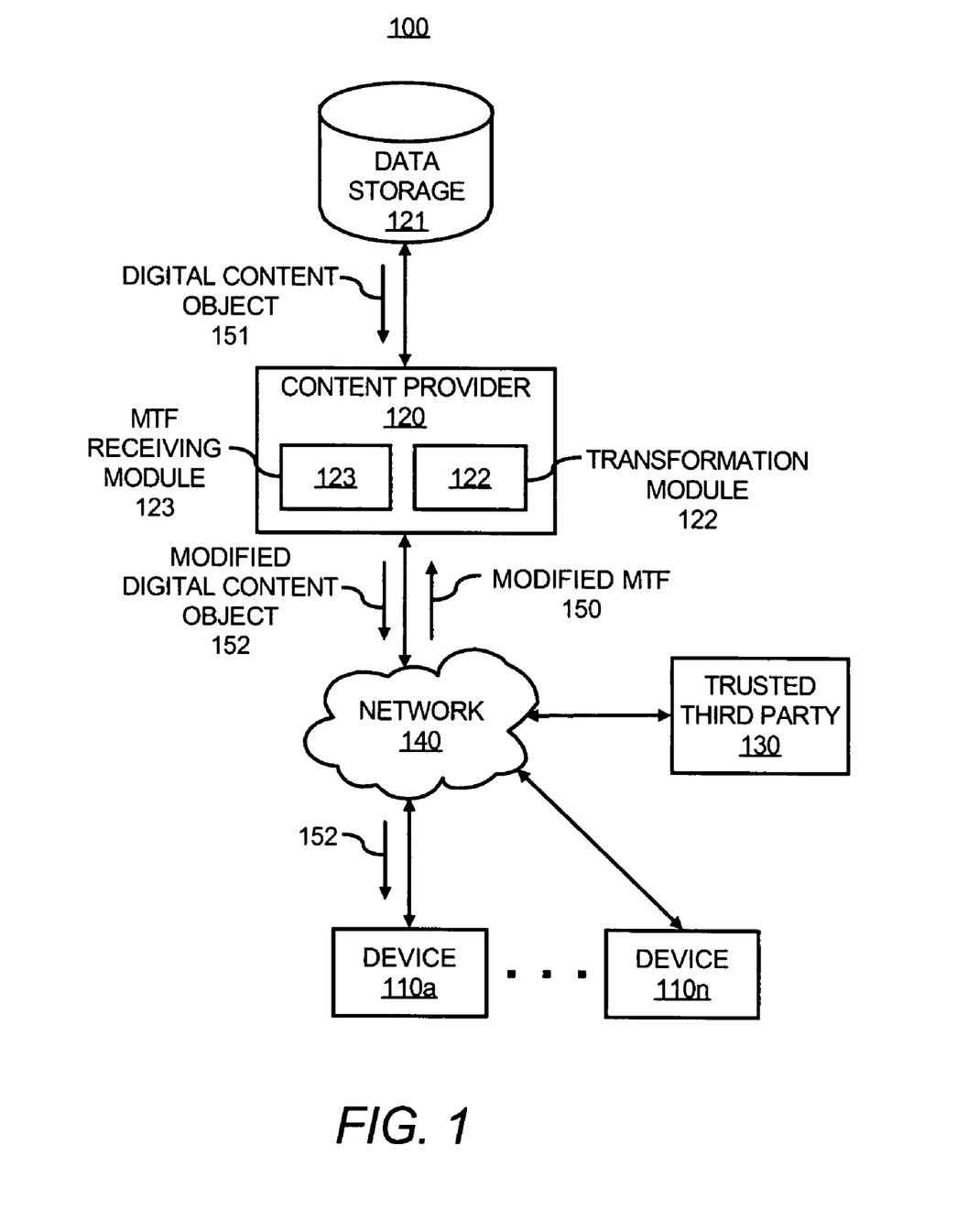
FIG. 1 illustrates a system operable to distribute digital content, according to an embodiment.

FIG. 1 illustrates a system 100, according to an embodiment, operable to distribute a modified version of digital content to a device. The system 100 includes a content provider 120, devices 110a-n and a trusted third party 130 that may communicate with each other via a network 140.

The content provider 120 includes a data storage 121 storing digital content objects. A digital content object is a unit of digital content, which may include a file or some other data structure for storing digital content. The data storage 121 may also store MTFs for each of the devices 110a-n.

The content provider 120 includes a transformation module 122 and an MTF receiving module 123. A module may include software, hardware or a combination of hardware and software. The transformation module 122 creates a modified digital content object for a device using a modified MTF for the device. For example, the device 110a requests a digital content object 151 from the content provider 120. The content provider 120 receives a modified MTF 150 for the device 110a. Each of the devices 110a-n has a different modified MTF. The modified MTF 150 for the device 110a may be transmitted from the device 110a or the third party 130 and is received by the MTF receiving module 123 at the content provider 120, which is described in further detail below.

The transformation module 122 uses the digital content object 151 and the modified MTF 150 as inputs to create the modified digital content object 152. The digital content object 151 may be stored in the data storage 121 and retrieved by the transformation module 122 or another module in the content provider 120 in response to the received request from the device 110a. The data object 151 is the original, unmodified digital content object, which may be provided from the content owner. For example, if the digital content object 151 is a song, the digital content object 151 may be the digital reproduction of the song generated by the producer of the song, and the content provider 120 may be an online music store selling the song. The digital content object 151 may be optimized for playback on a device with a nominal MTF.

The transformation module 122 creates a modified digital content object 152 from the digital content object 151 and the modified MTF 150 for the device 110a. The modified digital content object 152 is distributed to the device 110a, for example, via the network 140.

The modified digital content object 152 is a modified version of the digital content object 151. Like the digital content object 151, the modified digital content object 152 is bits representing the content. However, the modified digital content object 152 is optimized for playback on a device with the modified MTF, such as the device 110a.

Figure 2:
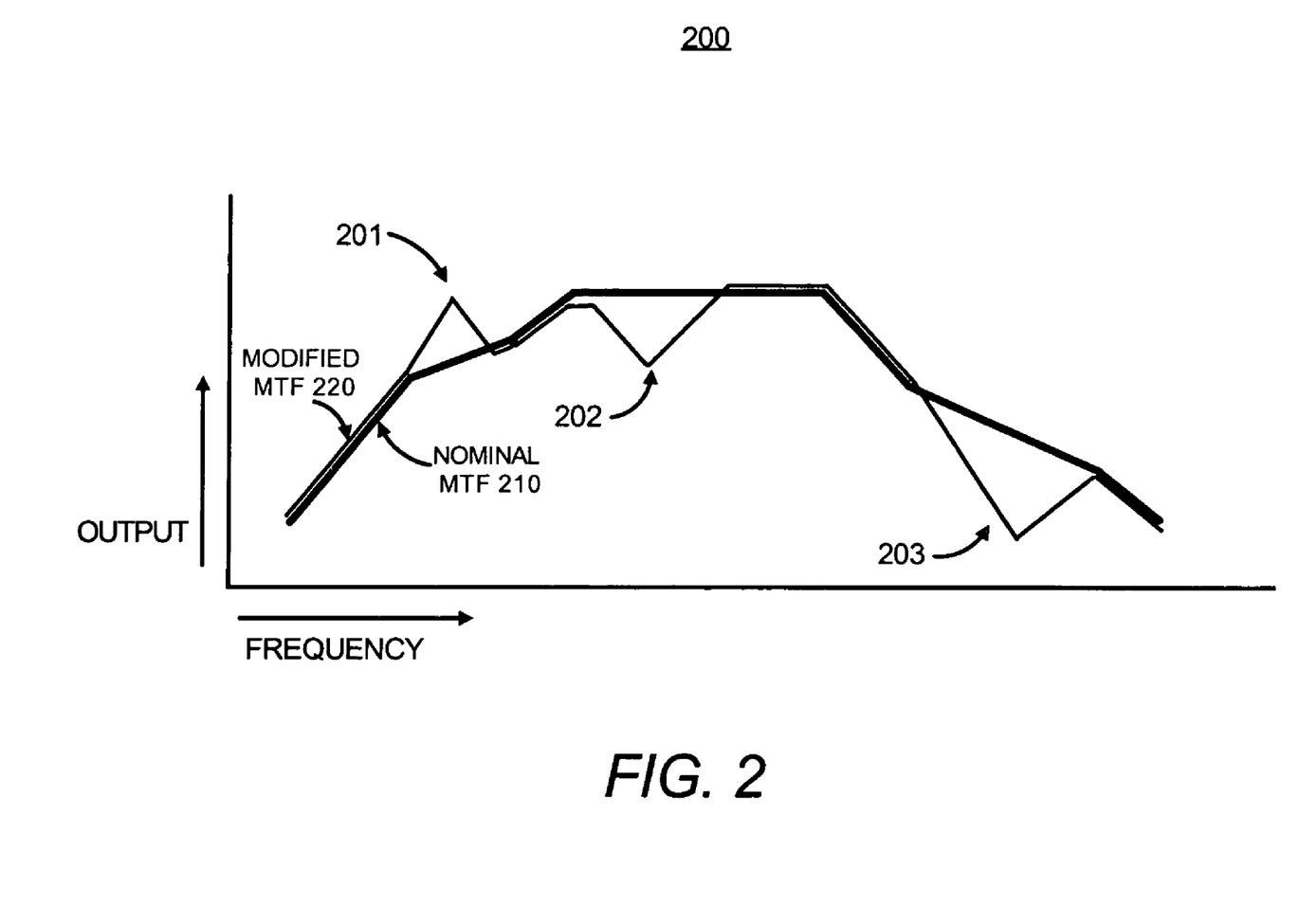
FIG. 2 illustrates a graph of a modulation transfer function, according to an embodiment.

FIG. 2 shows an example of modifying a digital content object, according to an embodiment. The modifying of the digital content object may be performed by the transformation module 122 shown in FIG. 1. FIG. 2 shows a graph 200 of a nominal MTF 210 and a modified MTF 220 for a device. The graph 200 includes an x-axis representing frequency and a y-axis representing output. The MTF 210 and the modified MTF 220, in this example, substantially overlap because the MTFs 210 and 220 are substantially the same except where intentional deviations from the nominal MTF 210 were introduced to create the modified MTF 220. For example, at section 201, the output of frequencies for the modified MTF 220 is higher than nominal. At sections 202 and 203, the output of frequencies for the modified MTF 220 is lower than nominal. The difference between the two curves representing MTF 210 and the modified MTF 220 are the modifications that are applied to the digital content to create modified digital content that is optimized for the device having the modified MTF 220.

In one example, the graph 200 represents the modified MTF 150 for a speaker of the device 110a, and the x-axis represents audio frequencies in a digital content object, such as a song or a video, and the y-axis represents output of the audio frequency in decibels. If section 201 represents frequencies around the music note A, then the modified MTF 150 indicates that note A plays louder than nominal on the device 110a. If sections 202 and 203 represent frequencies around the music notes B and C respectively, then the modified MTF 150 indicates that notes B and C play softer than nominal on the device 110a.

In another example, the graph 200 represents the modified MTF 150 for a display of the device 110a, and the x-axis represents visual frequencies in a digital content object, such as a still image, and the x-axis represents output of the video frequency, such as luminance or brightness of colors of pixels represented by the frequencies. If section 201 represents frequencies around the color red, then the modified MTF 150 indicates that shades of red are brighter in an image displayed on the device 110a. If sections 202 and 203 represent frequencies around the colors green and blue respectively, then the modified MTF 150 indicates that shades of green and blue are dimmer in an image displayed on the device 110a.

The transformation module 122 shown in FIG. 1 is operable to transform digital content to match the modified MTF. For example, if the digital content object 151 is a song and the graph 200 represents the modified MTF 150 for a speaker of the device 110a where output around notes A-C are modified, the digital content object 151 is modified so frequencies around the music note A play softer to compensate for the deviations shown in FIG. 2 at section 201. Also, the digital content object 151 is modified so frequencies around the music notes B and C play louder to compensate for the deviations shown in FIG. 2 at sections 202 and 203.

In the other example, where the graph 200 represents the modified MTF 150 for a display of the device 110a, the transformation module 122 modifies the digital content object 151 so shades of red are dimmer to compensate for the deviations shown in FIG. 2 at section 201. Also, the digital content object 151 is modified so shades of green and blue are brighter to compensate for the deviations shown in FIG. 2 at sections 202 and 203.

In one embodiment, the transformation module 122 modifies the digital content object 151 to match the modified MTF 150 of the device 110a to create the modified digital content 152 using well known digital signal processing techniques. For example, Fourier transform may be used to convert the digital content object 151 to the frequency domain, and the output of certain frequencies are modified to match the modified MTF 150. For video, the frequencies of each frame may be modified as needed.

After creating the modified digital content 152, the content provider 120 distributes the modified digital content 152 to the device 110a. The modified digital content 152 may be downloaded from the content provider 120 via the Internet or other network, represented by the network 140. The modified digital content 152 may be distributed on a physical medium, such as a DVD or CD or otherwise provided to the device 110a.

The system 100 in FIG. 1 shows multiple devices 110a-n. Each of the devices 110a-n has a different modified MTF. The deviations from a nominal MTF for each device may be randomly selected or selected using other techniques such that each of the devices 110a-n has a different modified MTF. Thus, a modified digital content object for one device will not play satisfactorily on another device. Although not shown, the system 100 may include multiple content providers and trusted third parties.

As described above, the content provider 120 may include an MTF receiving module 123 for receiving a modified MTF for a device. According to an embodiment, the modified MTF for each of the devices 110a-n is protected from unauthorized access. If an unauthorized user obtains the modified MTF 150 for the device 110a and the modified digital content object 152 for the device 110a, the unauthorized user may be able to convert the modified digital content object 152 back to the digital content object 150 so the digital content object 150 may be played on any device with a nominal MTF. Thus, the modified MTF for each of the devices 110a-n is protected from unauthorized access.

In one embodiment, the modified MTF 150 is securely transmitted from the device 110a or the trusted third party 130 to the content provider 120 using encryption. For example, the device 110a encrypts the modified MTF 150 with a public key of the content provider 120, and the MTF receiving module 123 at the content provider 120 decrypts the modified MTF 150 with a corresponding private key of the content provider 120 and may store the modified MTF 150 in the data storage 121. Instead of using the public key of the content provider 120, the device 110a may encrypt the modified MTF 150 with the public key of the trusted third party 130, such as the device manufacturer, and sends the encrypted modified MTF 150 to the trusted third party 130. The trusted third party 130 sends the decrypted modified MTF 150 to the content provider 120 and the content provider 120.

In another embodiment, it may not be necessary to transfer a device's modified MTF to the content provider 120 if the modified MTF and the rendering software can be protected from the device owner, such as with a trusted platform module (TPM) in the device. A TPM is tamper resistant hardware that has some software. A TPM may have a processor or processing circuitry and a limited amount of volatile and nonvolatile memory. The TPM may be a chip in the device that is separate from other hardware in the device. The TPM may store keys and have the ability to perform cryptographic operations, such as creating and deleting encryption keys and encryption/decryption, and create and sign digital certificates. Standards and specifications for TPMs may be provided by the Trusted Computing Group (TCG) organization. A TPM is one type of trusted hardware that may be used in this embodiment. It will be apparent to one of ordinary skill in the art that other types of trusted hardware may instead be used. Trusted hardware may include hardware that is tamper resistant and that can be authenticated.

Figure 6:
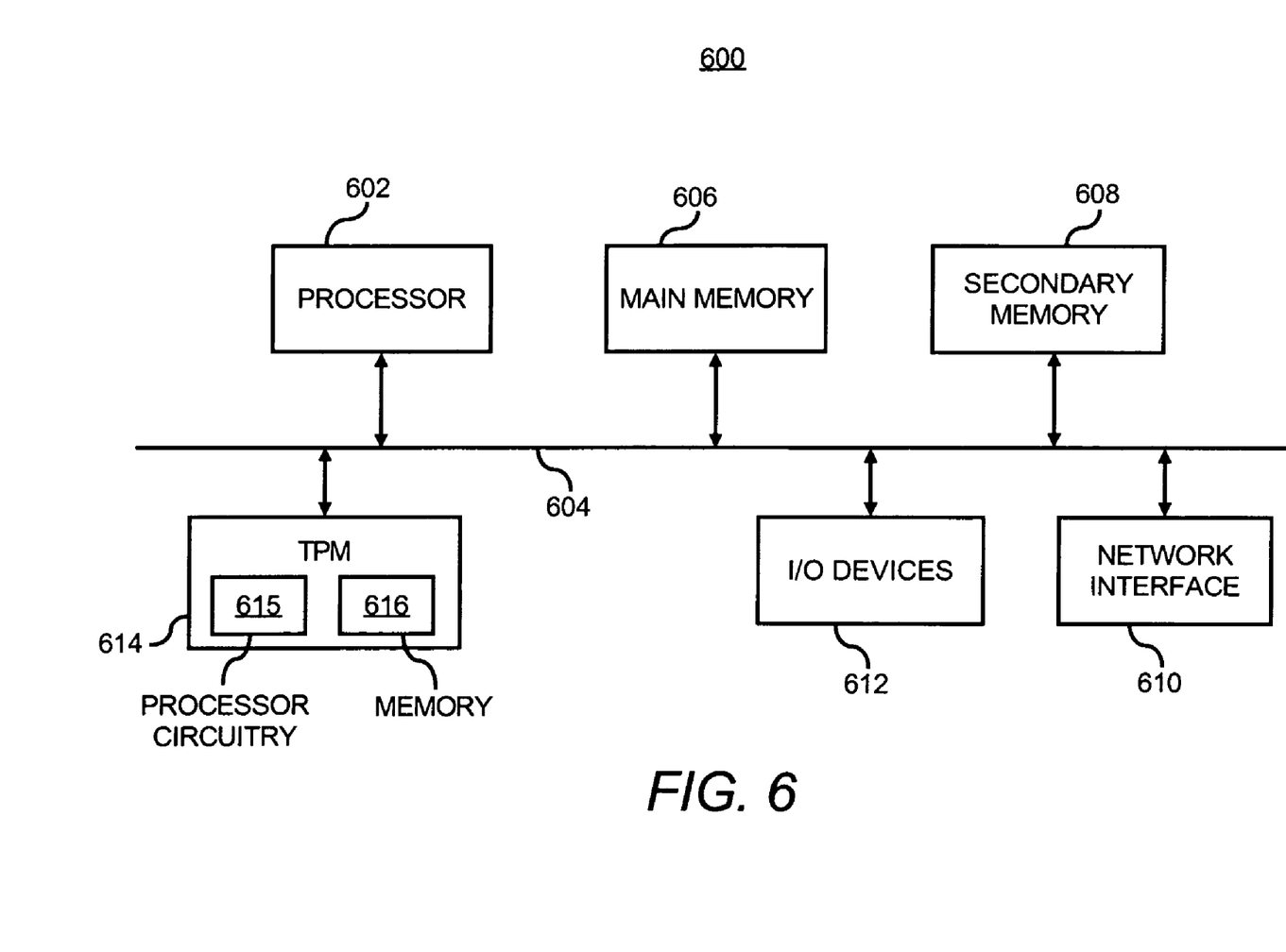
FIG. 6 illustrates a block diagram of a device, according to an embodiment.

In this embodiment, the transformation module 122 may be provided in a TPM in a device, such as the device 110a. The TPM receives the digital content object 151 and converts it to the modified digital content object 152. The modified digital content object 151 is then stored outside the TPM or otherwise made available to a media player outside the TPM. The digital content object 151 may be encrypted prior to sending the digital content object 151 to the device 110a, and the TPM is operable to decrypt the digital content object 151. The TPM is shown in FIG. 6 illustrating a block diagram of a device, according to an embodiment.

Users may have their own digital content, such as home movies, digital pictures, audio recordings, etc., that they wish to play on a device with a modified MTF. To playback personal digital content without giving the user access to the modified MTF, the personal digital content may be converted in the TPM to modified personal digital content matching the modified MTF. Alternatively, the user may send the personal digital content to a trusted party, such as the device manufacturer, for conversion to the modified personal digital content.

Figure 3:
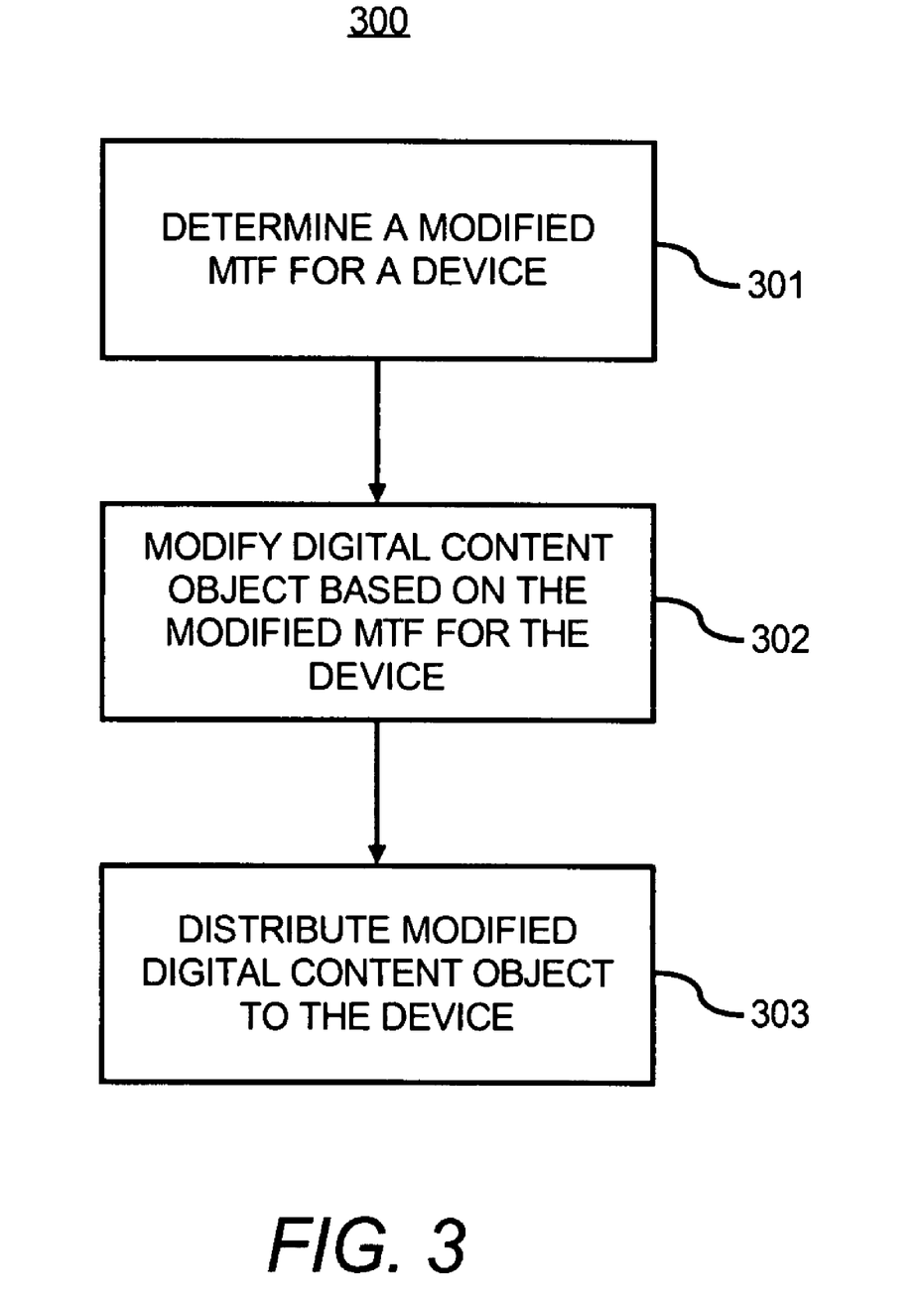
FIG. 3 illustrates a flow chart of a method of using a modulation transfer function of a device to create a modified digital content object for distribution to the device, according to an embodiment.

FIG. 3 illustrates a flow chart of a method of using an MTF of a device to create a modified digital content object for distribution to the device, according to an embodiment. The method 300 is described with respect to FIGS. 1 and 2 by way of example and not limitation.

At step 301, a modified MTF for a device is determined. This may include receiving the modified MTF and/or retrieving the modified MTF from storage. For example, the modified MTF 150 for the device 110a shown in FIG. 1 is received at the content provider 120. The modified MTF 150 may be encrypted with a cryptographic key for securely sending the modified MTF 150 to the content provider 120 to prevent unauthorized access to the modified MTF 150. In another embodiment, the device 110a stores the modified MTF 150 in a TPM or other trusted hardware in the device 110a and the modified MTF 150 may be retrieved for creating the modified digital content object 152 at the device 110a.

The modified modulation transfer function includes intentional deviations from a nominal modulation transfer function for the device. For example, as described with respect to FIG. 2, X's in sections 201-203 in the graph 200 represent intentional deviations from a nominal modulation transfer function.

The modified MTF may be determined at step 301 in response to receiving a request for a digital content object and payment for the digital content object. For example, a user of the device 110a may purchase a song or other digital content from the content provider 120. Once payment is received and a determination is made that the payment is received, the content provider 120 creates the modified digital content object 152 for distribution to the device 110a, for example, via the Internet.

At step 302, a digital content object is modified based on the modified MTF for the device. For example, the modified digital content object 152 is created from the digital content object 151 using the modified MTF 150 for the device 110a. The modified digital content object 152 is optimized for playback on the device 110a because the modified digital content object 152 is created using the modified MTF 150 of the device 110a.

At step 303, the modified digital content object is distributed to the device. For example, the modified digital content object 152 is distributed via a network or using a physical medium, such as a CD or DVD, to the device 110a. In another example, where the modified digital content object 152 is created in a TPM in the device, distributing may include providing the modified digital content object to a media player outside the TPM.

Figure 4:
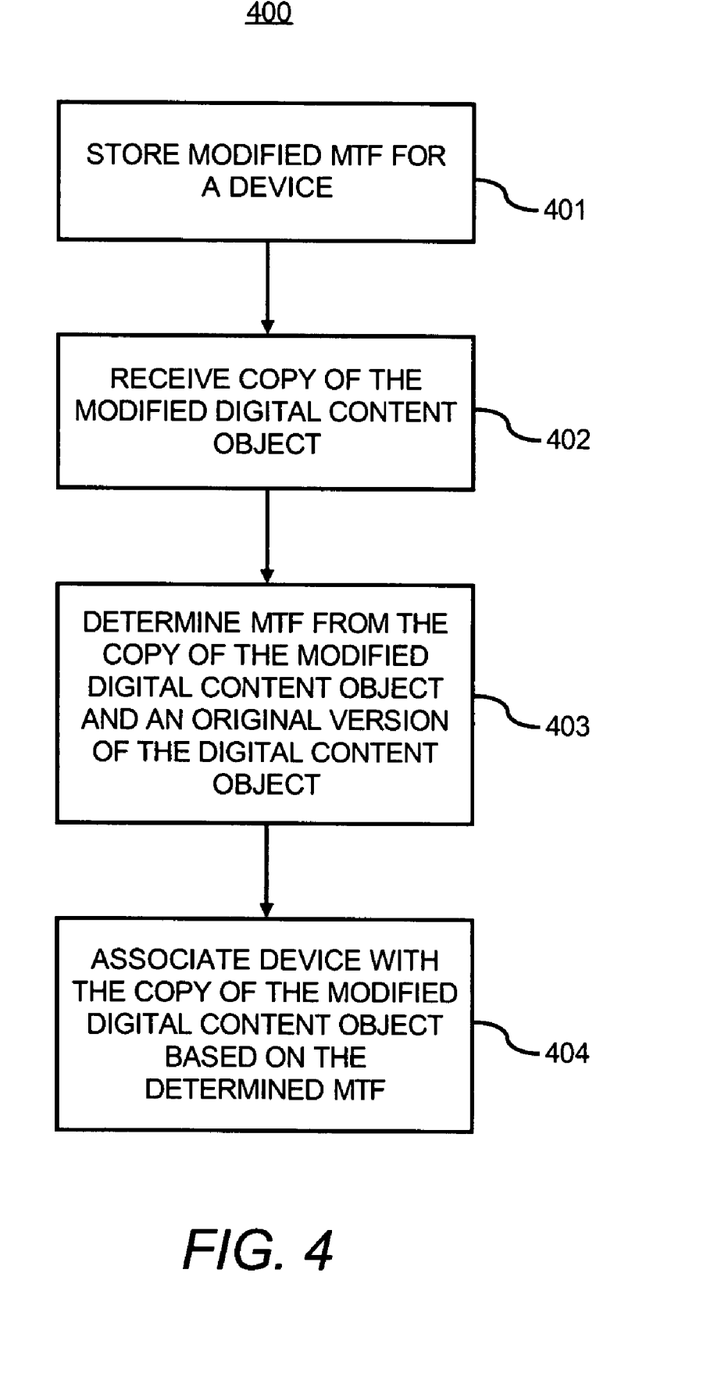
FIG. 4 illustrates a flow chart of a method for identifying a device associated with a modified digital content object, according to an embodiment.

FIG. 4 illustrates a flow chart of a method 400, according to an embodiment. The method 400 may be described with respect to FIGS. 1 and 2 by way of example and not limitation.

At step 401, a modified MTF for a device is stored. For example, the content provider 120 shown in FIG. 1 stores the modified MTF 150 for the device 110a in the data storage 121.

At step 402, a copy of the modified digital content object is received. For example, the content provider 120 receives a copy of the modified digital content object 152. This may include a copy of the modified digital content object 152 made by the device 110*a*.

At step 403, a modified MTF is determined from the copy of the modified digital content object and an original version of the digital content object. For example, the transformation module 122 shown in FIG. 1 may determine the modified MTF for the copy using the copy of the modified digital content object 152 and the original digital content object 151.

At step 404, a device is associated with the copy of the modified digital content object based on the determined modified MTF for the copy. For example, the data storage 121 may include a database storing an identification or representation of each of the stored modified MTFs and an identification of the corresponding device of the devices 110*a-n* for each stored modified MTF. The modified MTF determined at step 403 is compared to the stored modified MTFs. If a match is found, an identification for the corresponding device is retrieved from the database.

The method 400 may be used to identify a device creating unauthorized copies of a digital content object. For example, the device 110*a* is making unauthorized copies of the modified content object 152. If an unauthorized copy is received at the content provider 120, its modified MTF 150 is determined from the copy. Then, a database lookup or a table lookup may be performed to match the modified MTF 150 with the device 110*a*.

Figure 5:
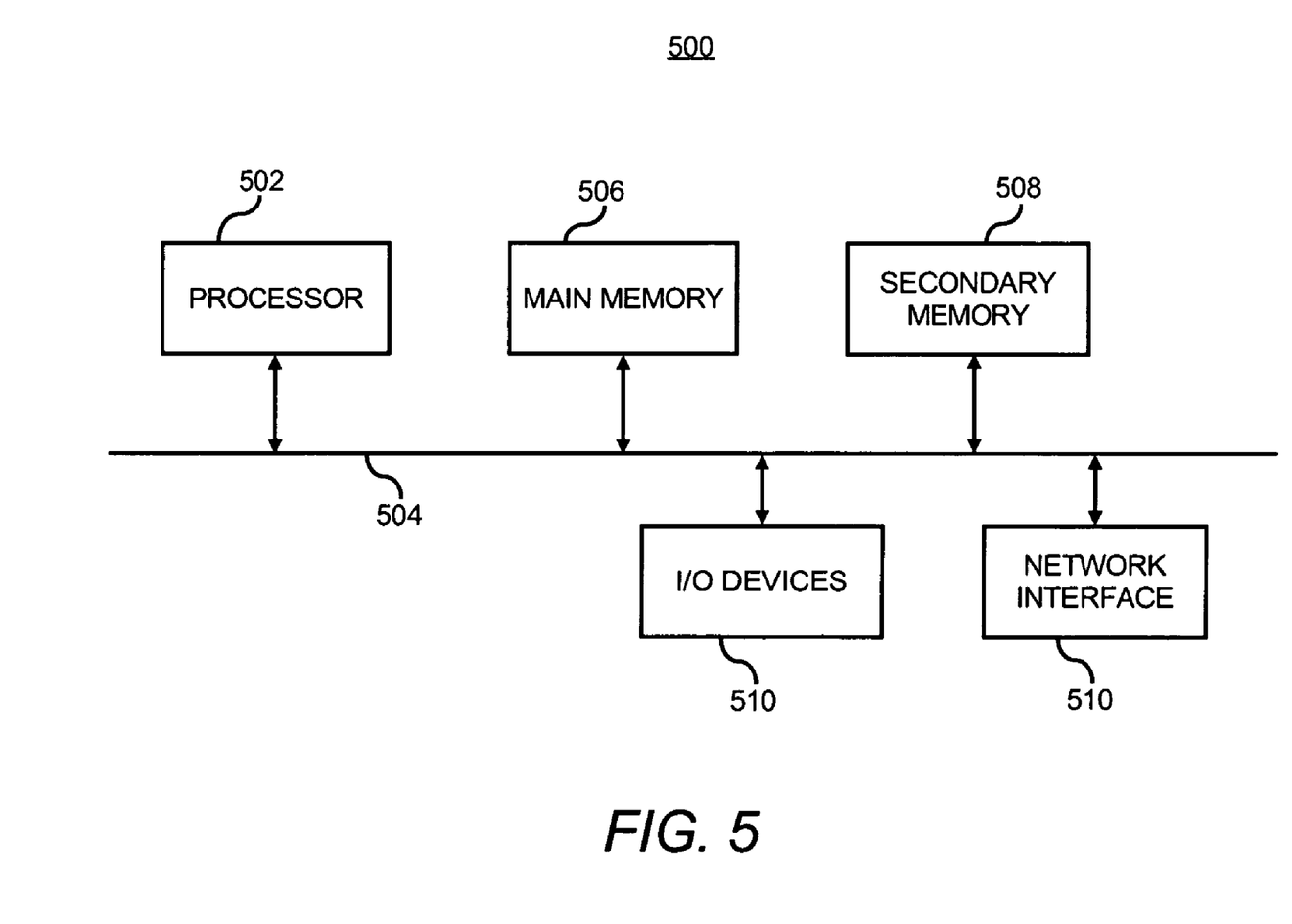
FIG. 5 illustrates a block diagram of a computer system, according to an embodiment.

FIG. 5 illustrates a block diagram of a computer system 500, according to an embodiment. The computer system 500 shown may be used as a platform for the content provider 120 or any of the devices 110*a-n*. The computer system 500 includes one or more processors, such as processor 802, providing an execution platform for executing software. Instead of a processor, other circuits may be used to perform the functions described herein, such as an ASIC or other circuits designed to perform the functions. Commands and data from the processor 502 are communicated over a communication bus 504. The computer system 500 also includes a main memory 506, such as a random access memory (RAM), where software may be resident during runtime, and a secondary memory 508. The secondary memory 508 includes, for example, a hard disk drive, removable storage, or other type of storage device. Other examples of the secondary memory 508 include ROM (read only memory), EPROM (erasable, programmable ROM), EEPROM (electrically erasable, programmable ROM).

The computer system 500 may include user interfaces comprising one or more input/output (I/O) devices 512, such as a keyboard, a mouse, a stylus, display, speakers, and the like. A network interface 510 may be provided for communicating with other computer systems.

If the computer system 500 represents a device, such as one of the devices 110*a-n* shown in FIG. 1, then modified MTF for the device may be representative of the output of speakers or a display, shown as I/O devices 812, for the device. Software stored and executed on the device may include a media player for playing digital content, such as songs, video, images, etc.

If the computer system 500 represents the content provider 120 shown in FIG. 1, the computer system 500 may include components of a server. Also, the content provider 120 executes software including the modules shown in FIG. 1.

FIG. 6 illustrates a block diagram of a device 600 with a TPM, according to an embodiment. The device 600 may be one of the devices 110*a-n* shown in FIG. 1. The device 600 includes many of the components shown and described above with respect to FIG. 5. In addition, the device 600 includes a TPM 614. The TPM 614 may include processor circuitry 615 and a memory 816.

In this embodiment, the transformation module 122 and the modified MTF 150 may be stored in the TPM 614 to prevent unauthorized access to the transformation module 122 and the modified MTF 150. For example, the TPM 614 receives the digital content object 151 and converts it to the modified digital content object 152. The modified digital content object 151 is then stored outside the TPM, such as in the main memory 606 and/or the secondary memory 608, and made available to a software media player outside the TPM 614, which may also be stored in the main memory 606 and/or the secondary memory 608 and executed by the processor 602.

It will be apparent to one of ordinary skill in the art that FIGS. 5 and 6 illustrate generic computer systems. One or more components shown in FIGS. 5 and 6 may or may not be used. The computer systems shown in FIGS. 5 and 6 may include more or less features depending on the complexity of the system needed.

One or more of the steps of the methods 300 and 400 and other steps described herein may be implemented as software embedded or stored on a computer readable medium. For example, one or more of the steps may be software stored in the memories shown in FIG. 5 or 6. The software may be executed by a processor or processor circuitry, also shown in FIG. 5 or 6. The steps may be embodied by a computer program, which may exist in a variety of forms both active and inactive. For example, there may exist as software program(s) comprised of program instructions in source code, object code, executable code or other formats for performing some of the steps when executed, for example, by a processor. Any of the above may be stored on a computer readable medium, which include storage devices, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Concrete examples of the foregoing include distribution of the programs or content on a CD ROM or via Internet download. It is therefore to be understood that those functions enumerated herein may be performed by any electronic device capable of executing the above-described functions.

What is claimed is:

1. A method of using a modulation transfer function of a device to create a modified digital content object for distribution to the device, the method comprising:

determining a modified modulation transfer function of a device, wherein the modified modulation transfer function includes intentional deviations from a nominal modulation transfer function of the device, and wherein the nominal modulation transfer function is a measure of a contrast from a digital content object to a playback of the digital content object on the device;

modifying the digital content object based on the modified modulated transfer function to optimize playback of the digital content object on the device; and distributing the modified digital content object to the device.

2. The method of claim 1, further comprising:

receiving the modified modulation transfer function encrypted with a cryptographic key.

3. The method of claim 2, wherein the cryptographic key is a public key of a trusted third party, the method further comprising:

receiving the modified modulation transfer function decrypted by the trusted third party with the trusted third party's private key.

4. The method of claim 2, wherein the cryptographic key is a public key of a content provider, the method further comprising:
decrypting the modified modulation transfer function with the content provider's private key.

5. The method of claim 1, further comprising:
protecting the modified modulation transfer function from unauthorized access by storing the modified modulated transfer function in a trusted platform module in the device.

6. The method of claim 5, wherein modifying a digital content object comprises modifying the digital content object in the device using a transformation module stored and executed in the trusted platform module to prevent unauthorized access to the transformation module.

7. The method of claim 6, wherein distributing the modified digital content object to the device comprises:
distributing the modified digital content object from the trusted platform module to a media player outside the trusted platform module.

8. The method of claim 1, wherein modifying a digital content object based on the modified modulated transfer function to optimize playback of the digital content object on the device comprises:
modifying output for an audio frequency or set of audio frequencies in the digital content object.

9. The method of claim 1, wherein modifying a digital content object based on the modified modulated transfer function to optimize playback of the digital content object on the device comprises:
modifying output for a visual intensity or set of visual intensities of pixels in the digital content object.

10. The method of claim 1, wherein a quality of the playback of the modified digital content object is degraded if the modified digital content object is played on a second device having a different modulation transfer function than the device.

11. The method of claim 1, further comprising:
receiving a copy of the modified digital content object; and
determining the modified modulation transfer function from the copy of the modified digital content object and an original version of the digital content object.

12. The method of claim 11, further comprising:
associating the device with the copy of the modified digital content object based on the determined modified modulation transfer function.

13. A computer system operable to use a modulation transfer function of a device to generate modified digital content for the device, the computer system comprising:
data storage storing a modified modulated transfer function for the device, wherein the modified modulation transfer function includes intentional deviations from a nominal modulation transfer function of the device, and wherein the nominal modulation transfer function is a measure of a contrast from a digital content object to a playback of the digital content object on the device;
a processor modifying the digital content object using the modified modulated transfer function to optimize playback of the digital content object on the device; and
an interface sending the modified digital content object to the device.

14. The computer system of claim 13, wherein the interface comprises a network interface sending the modified digital content object to the device via a network.

15. The computer system of claim 13, wherein the digital content object was purchased by a user for playback on the device.

16. The computer system of claim 13, wherein the digital content object comprises at least one of a music file and a video file.

17. The computer system of claim 13, wherein the deviations comprise at least one of deviations of an output for an audio frequency or a visual frequency from the nominal modulation transfer function for the device.

18. The computer system of claim 13, wherein the deviated modulated modulation transfer function is encrypted and sent to the computer system.

19. A method of providing digital content, the method comprising:
determining that payment for digital content object to be played on a device is received;
determining a modulation transfer function of the device, wherein the modulation transfer function is derived from a measure of a contrast from the digital content object to a playback of the digital content object on the device;
modifying the digital content object based on the modulated transfer function to optimize playback of the digital content object on the device; and
distributing the modified digital content to the device via the Internet.

20. The method of claim 19, wherein the modulation transfer function includes intentional deviations from a nominal modulation transfer function of the device, wherein the nominal modulation transfer function is a measure of the contrast from the digital content object to a playback of the digital content object on the device.

* * * * *